US012220798B2

(12) United States Patent
Tsai et al.

(10) Patent No.: US 12,220,798 B2
(45) Date of Patent: Feb. 11, 2025

(54) ELECTRIC POWER TOOL AND METHOD OF CONTROLLING THE SAME

(71) Applicant: BASSO INDUSTRY CORP., Taichung (TW)

(72) Inventors: Cheng-En Tsai, Taichung (TW); An-Gi Liu, Taichung (TW); Chang-Sheng Lin, Taichung (TW); Fu-Ying Huang, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 86 days.

(21) Appl. No.: 18/337,687

(22) Filed: Jun. 20, 2023

(65) Prior Publication Data

US 2023/0405782 A1 Dec. 21, 2023

(30) Foreign Application Priority Data

Jun. 21, 2022 (TW) ................................. 111123042

(51) Int. Cl.
*B25C 1/06* (2006.01)
*B25C 1/00* (2006.01)

(52) U.S. Cl.
CPC ..................................... *B25C 1/06* (2013.01)

(58) Field of Classification Search
CPC ................................... B25C 1/06; B25C 1/00
See application file for complete search history.

(56) References Cited

U.S. PATENT DOCUMENTS 4,042,036 A * 8/1977 Smith ........................ B25C 1/06 74/125.5
5,012,967 A * 5/1991 Johansson ............. B25C 5/0228 307/41
6,705,503 B1 * 3/2004 Pedicini .................... B25C 1/06 173/205
8,011,547 B2 * 9/2011 Leimbach ............... B25C 1/041 227/129
8,141,761 B2 * 3/2012 Draht ...................... B27F 7/006 29/760
8,240,534 B2 * 8/2012 Hirabayashi .............. B25C 1/06 227/132
8,511,532 B2 * 8/2013 Chien ....................... B25C 1/06 227/120
8,800,834 B2 * 8/2014 Pedicini .................... B25C 1/06 60/370
8,991,675 B2 * 3/2015 Liang ..................... B25D 11/00 227/129

(Continued)

*Primary Examiner* — Gloria R Weeks
(74) *Attorney, Agent, or Firm* — Burris Law, PLLC

(57) ABSTRACT

An electric power tool includes a motor, a lifter, a firing pin, an electromagnet, a driving circuit, a latch, and a controller. The lifter is driven by the motor to drive the firing pin to perform a firing action. The driving circuit provides electric current to excite the electromagnet. The latch is moved by the electromagnet from a blocking position where the latch blocks the firing pin to move in a firing direction to a non-blocking position where the latch does not block the firing pin when the electromagnet is in an excited state. The controller, during an excitement period, controls the driving circuit to provide constant current for a first time period to excite the electromagnet to the excited state, and provide pulsating current for a second time period to keep the electromagnet in the excited state.

10 Claims, 10 Drawing Sheets

(56) References Cited

U.S. PATENT DOCUMENTS

| | | | | |
|---|---|---|---|---|
| 10,173,310 | B2 * | 1/2019 | Wyler | B25C 1/06 |
| 10,618,155 | B2 * | 4/2020 | Moore | H02K 35/02 |
| 10,632,601 | B2 * | 4/2020 | Pomeroy | B25C 1/047 |
| 10,654,155 | B2 * | 5/2020 | Meyer | B25C 1/06 |
| 10,821,586 | B2 * | 11/2020 | Wu | B25C 1/047 |
| 10,843,317 | B2 * | 11/2020 | Sato | B25C 1/047 |
| 2006/0180631 | A1 * | 8/2006 | Pedicini | B25C 1/06 227/8 |
| 2009/0032567 | A1 * | 2/2009 | Liang | B25C 1/06 227/131 |
| 2015/0336253 | A1 * | 11/2015 | Pedicini | B25C 1/06 227/8 |

* cited by examiner

ELECTRIC POWER TOOL AND METHOD OF CONTROLLING THE SAME

CROSS-REFERENCE TO RELATED APPLICATION

This application claims priority to Taiwanese Invention Patent Application No. 111123042, filed on Jun. 21, 2022.

FIELD

The disclosure relates to an electric power tool and a method of controlling the same.

BACKGROUND

A conventional electric power tool disclosed in U.S. Pat. No. 8,011,547B2 is configured to enable or disable a firing action based on whether an electromagnet of the electric power tool is excited or not. However, when the electromagnet is provided with electric current and is excited for a long time, an enameled wire and a core of the electromagnet may be burned due to high temperature generated by the electromagnet. One solution is to increase heat resistance of the enameled wire and the core by, for example, increasing a diameter of coil of the enameled wire or increasing the number of turns of the winding of the enameled wire. However, such solution not only increases the cost of the electric power tool, but also increases inner temperature of the electric power tool.

SUMMARY

Therefore, an object of the disclosure is to provide an electric power tool and a method of controlling the electric power tool that can alleviate at least one of the drawbacks of the prior art.

According to the disclosure, an electric power tool includes a motor, a lifter, a firing pin, an electromagnet, a driving circuit, a latch, and a controller. The lifter is configured to be driven by the motor. The firing pin is configured to be driven by the lifter to move from a bottom dead center to a standby position where the firing pin is ready to perform a firing action. The bottom dead center is farthest from the standby position in a firing direction from the standby position to the bottom dead center, and the firing pin is at the bottom dead center after finishing the firing action. The driving circuit is electrically connected to the electromagnet and is configured to provide an electric current to excite the electromagnet. The latch is configured to be moved by the electromagnet from a blocking position to a non-blocking position when the electromagnet is in a fully excited state, and be in the blocking position when the electromagnet is in a non-excited state, where the latch in the blocking position blocks the firing pin from moving to the bottom dead center, and the latch in the non-blocking position does not block the firing pin from moving to the bottom dead center. The controller is electrically connected to the driving circuit and is configured to, during an excitement period, control the driving circuit to provide a constant electric current to the electromagnet for a first time period to excite the electromagnet to the fully excited state, and immediately after the first time period, control the driving circuit to provide a pulsating electric current to the electromagnet for a second time period to keep the electromagnet in the fully excited state.

According to the disclosure, a method of controlling an electric power tool is provided. The electric power tool includes a motor, a lifter configured to be driven by the motor, a firing pin configured to be driven by the lifter to move from a bottom dead center to a standby position where the firing pin is ready to perform a firing action, an electromagnet, a driving circuit electrically connected to the electromagnet and configured to provide an electric current to excite the electromagnet, a latch configured to be moved by the electromagnet, and a controller electrically connected to the driving circuit. The bottom dead center is farthest from the standby position in a firing direction from the standby position to the bottom dead center.

The method includes steps of: during an excitement period, the controller controlling the driving circuit to provide a constant electric current to the electromagnet for a first time period to excite the electromagnet to a fully excited state, such that the latch is moved by the electromagnet from a blocking position where the latch blocks the firing pin from moving to the bottom dead center to a non-blocking position where the latch does not block the firing pin from moving to the bottom dead center when the electromagnet is in the fully excited state, wherein the latch is in the blocking position when the electromagnet is in a non-excited state; and immediately after the first time period, the controller controlling the driving circuit to provide a pulsating electric current to the electromagnet for a second time period to keep the electromagnet in the fully excited state.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
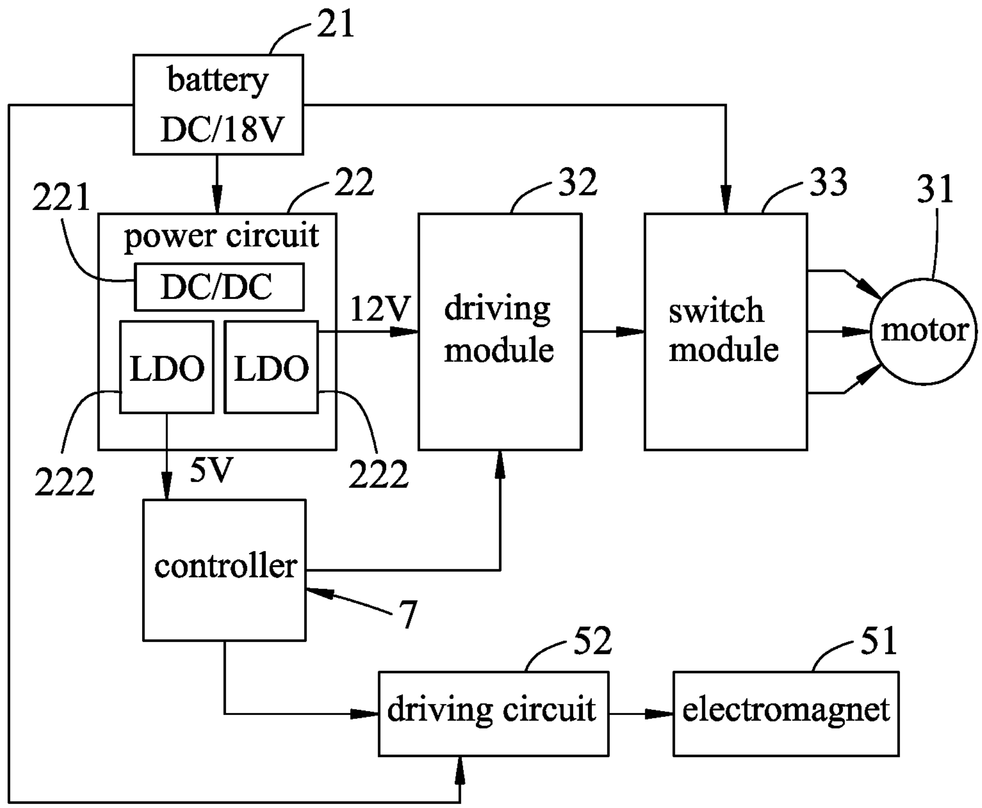
FIG. 1 is a block diagram illustrating a circuit of an electric power tool according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 3:
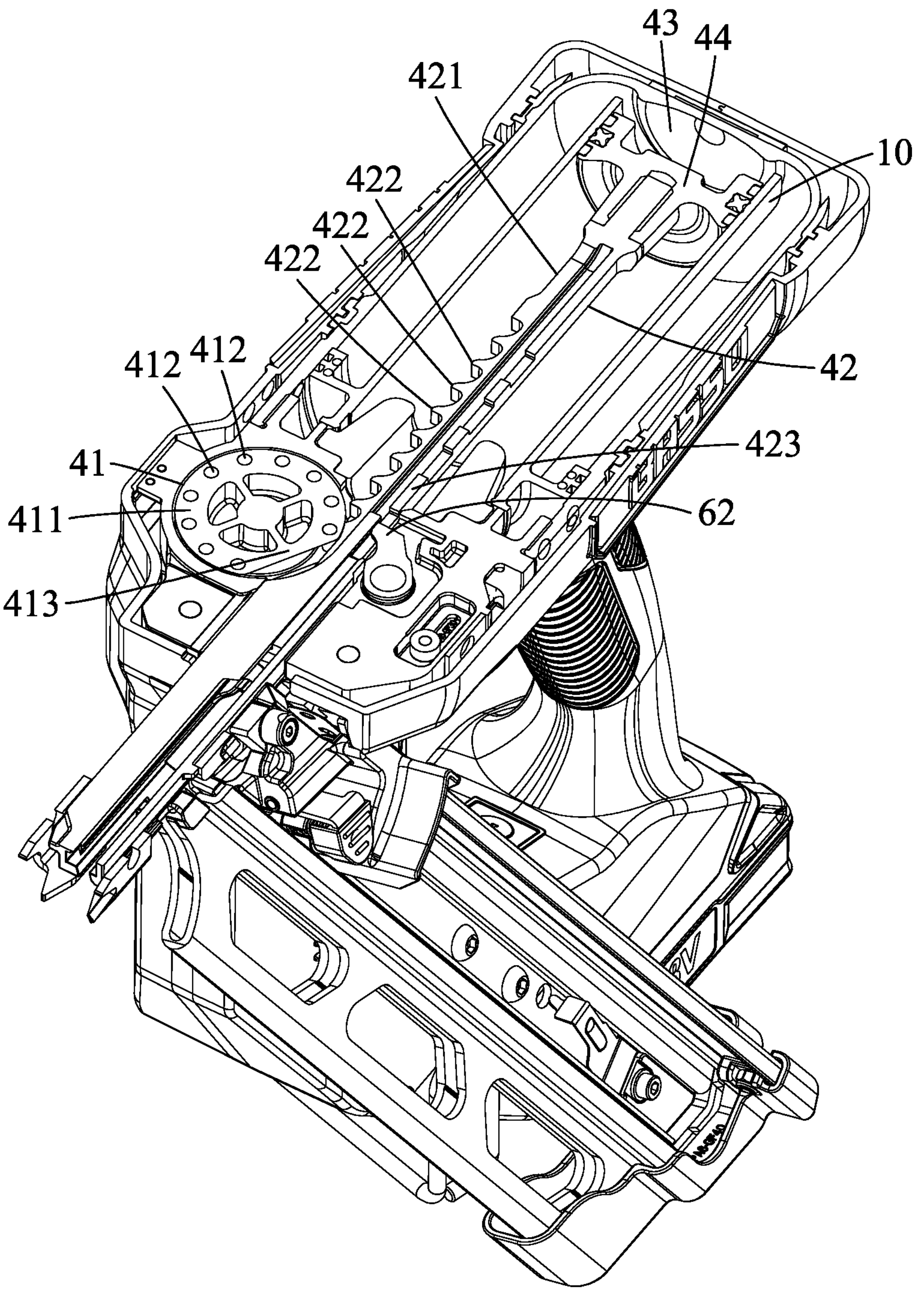
FIG. 3 is a perspective view illustrating an electric power tool according to an embodiment of the disclosure.
Figure 4:
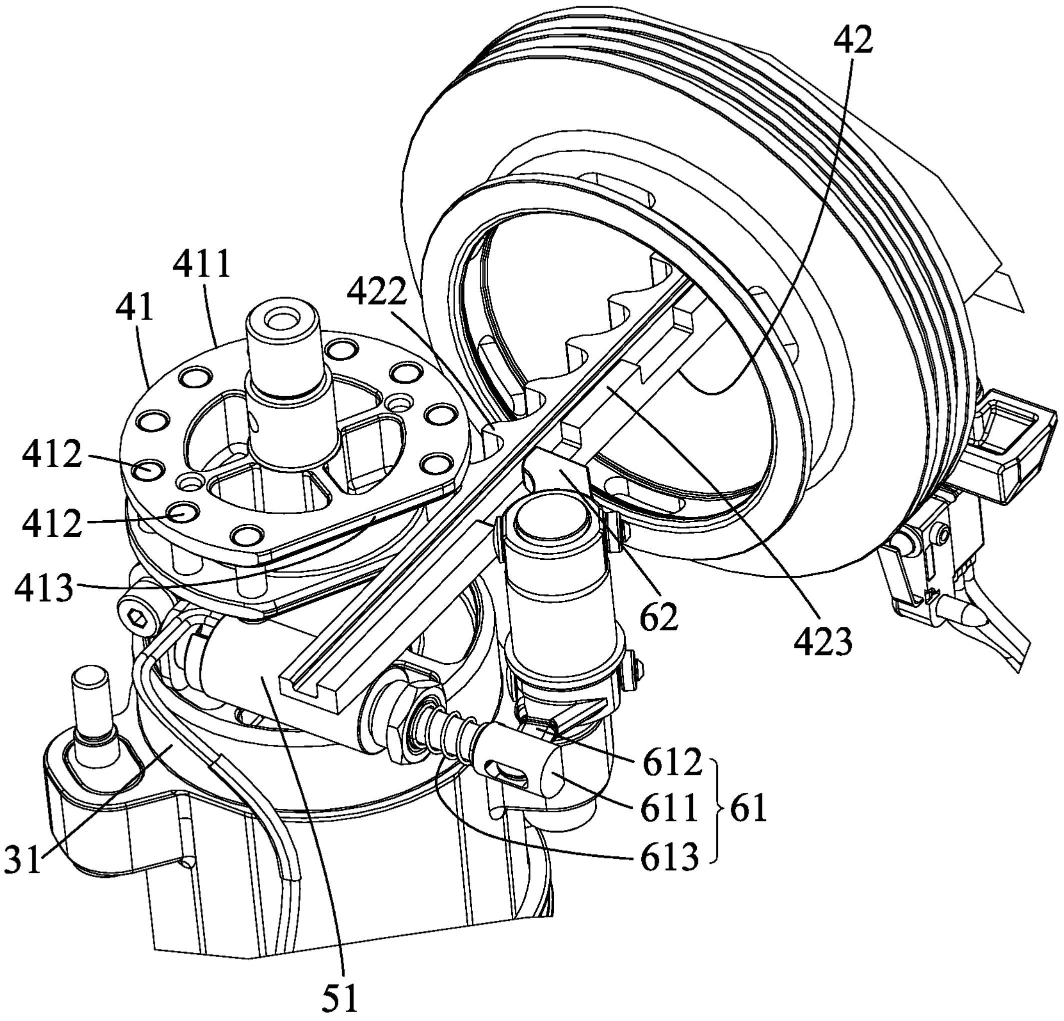
FIG. 4 is fragmentary perspective view illustrating an electric power tool according to an embodiment of the disclosure.

Referring to FIGS. 1, 3 and 4, an electric power tool according to an embodiment of the disclosure is provided. In this embodiment, the electric power tool is a pneumatic electric nail gun, and includes a battery 21, a power circuit 22, a motor 31, a driving module 32, a switch module 33, a lifter 41 configured to be driven by the motor 31, a firing pin 42 configured to be driven by the lifter 41, a piston 44 connected to the firing pin 42, an electromagnet 51, a driving circuit 52, a joint 61 configured to be driven by the electromagnet 51, a latch 62 configured to be driven by the joint 61, and a controller 7. The electric power tool further includes a housing 10, and the piston 44 cooperates with the housing 10 to define a pressure chamber 43.

The power circuit 22 is electrically connected to the battery 21, and is configured to stabilize and transform electric energy provided by the battery 21 (e.g., DC 18V) for use by other internal circuits of the electric power tool. The power circuit 22 includes a direct-current to direct-current converter (DC-DC converter) 221 and, for example, two low-dropout regulators (LDOs) 222. The LDOs 222 provide electric energy with different voltages (e.g., 5V and 12V) respectively for the controller 7 and the driving module 32.

The motor 31 may be implemented using a brushless DC motor (BLDC). The driving module 32 is electrically connected to the switch circuit 33, and the switch circuit 33 is electrically connected to the motor 31. The driving module 32 is further electrically connected to the controller 7, and is configured to receive a control signal in a form of a pulse-width modulation (PWM) signal outputted by the controller 7, and to control the switch circuit 33 to drive the motor 31 to rotate at a desired rotational speed based on a duty cycle of the control signal thus received. The switch circuit 33 may be implemented using a metal-oxide-semiconductor field-effect transistor (MOSFET) switch.

The lifter 41 is connected to the motor 31, and is configured to be driven by the motor 31, where the lifter 41 then drives the firing pin 42 to move to perform a firing procedure. The lifter 41 includes a lifting wheel 411 that is configured to rotate (in a counter-clockwise direction in FIG. 3) when being driven by the motor 31, a plurality of posts 412 arranged along part of a circumference of the lifting wheel 411, and a sliding surface 413 at the rest of the circumference. The firing pin 42 includes a shaft 421, a plurality of teeth 422 that are positioned along the shaft 421, and a block 423 disposed on the shaft 421 near a distal end of the shaft 421 that is opposite to the other end connected to the piston 44.

When a user presses a trigger switch (not shown) of the electric power tool, the firing procedure will be performed immediately. At the beginning of the firing procedure, the firing pin 42 is originally located at a standby position where the firing pin 42 is ready to perform a firing action (see FIG. 3). The firing pin 42 is at a bottom dead center after finishing the firing action, and the bottom dead center is farthest from the standby position in a firing direction from the standby position to the bottom dead center (i.e., a direction in which an object, for example, a nail, is shot by the electric power tool). When the firing pin 42 is located at the standby position, a first one of the posts 412 of the lifter 41 in the counter-clockwise direction is interlocked with a last one of the teeth 422 of the firing pin 42 in the firing direction, and the motor 31 drives the lifting wheel 411 to rotate, thus driving the firing pin 42 to move from the standby position to a top dead center in an opposite direction that is opposite to the firing direction. The top dead center is farthest from the standby position in the opposite direction. When the firing pin 42 is at the top dead center, the piston 44 compresses a volume of gas in the pressure chamber 43 to increase a pressure therein. When the lifting wheel 411 rotates to where the first one of the posts 412 is disengaged from the last one of the teeth 422 (i.e., when the teeth 422 reaches the sliding surface 413), the firing pin 42 is driven by the pressure in the pressure chamber 43 to move in the firing direction from the top dead center to the bottom dead center to complete the firing action (e.g., firing of a nail not shown in the drawings). That is to say, the firing action includes the firing pin 42 moving from the standby position to the top dead center by lifter 41 driven by the motor 31, and then the firing pin 42 moving from the top dead center to the bottom dead center by the pressure in the pressure chamber 43 to fire a nail. The motor 31 continues to drive the lifting wheel 411 to rotate, and the posts 412 are interlocked with the teeth 422 again, thus driving the firing pin 42 to move from the bottom dead center toward the standby position for completing the firing procedure. That is to say, the firing procedure includes the firing pin 42 performing the firing action, and then the firing pin 42 moving from the bottom dead center back to the standby position. In this embodiment, the posts 412 of the lifter 41 are disengaged from the teeth 422 of the firing pin 42 at the top dead center.

Figure 2:
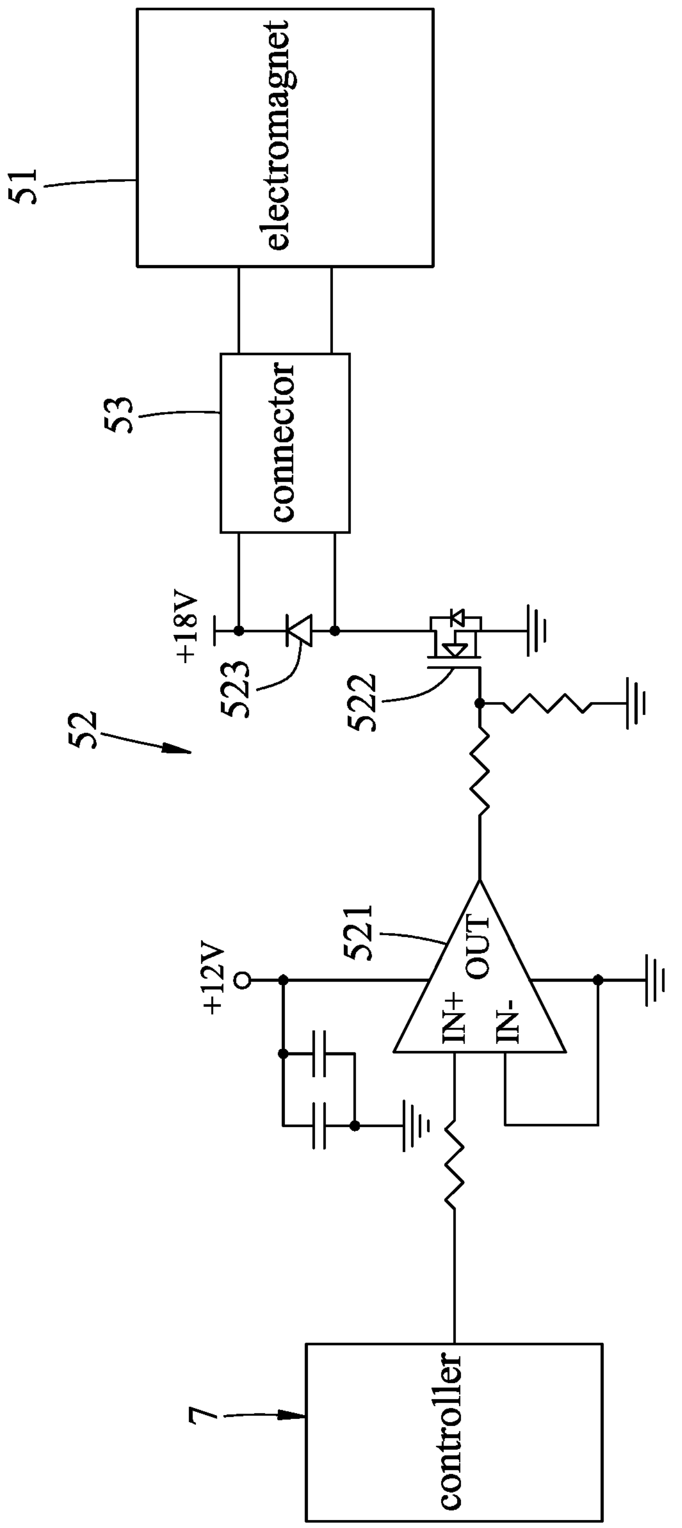
FIG. 2 is a circuit diagram illustrating a driving circuit for exciting an electromagnet of the electric power tool according to an embodiment of the disclosure.
Figure 7:
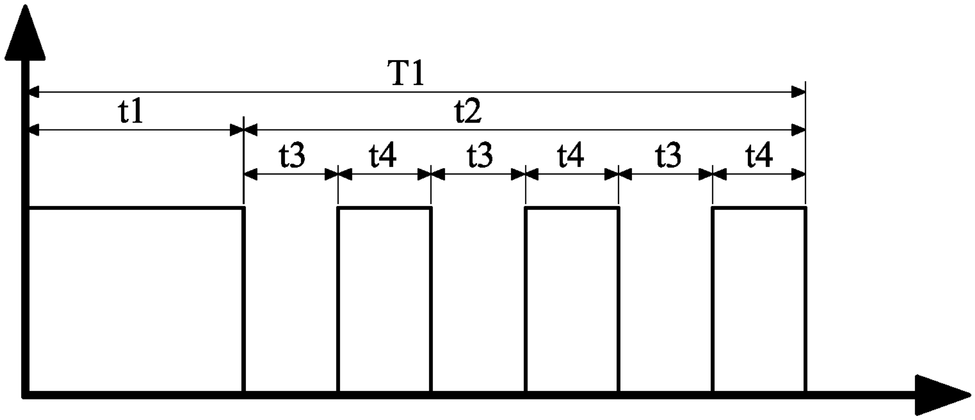
FIGS. 7 to 9 are plots illustrating different driving signals according to an embodiment of the disclosure.
Figure 8:
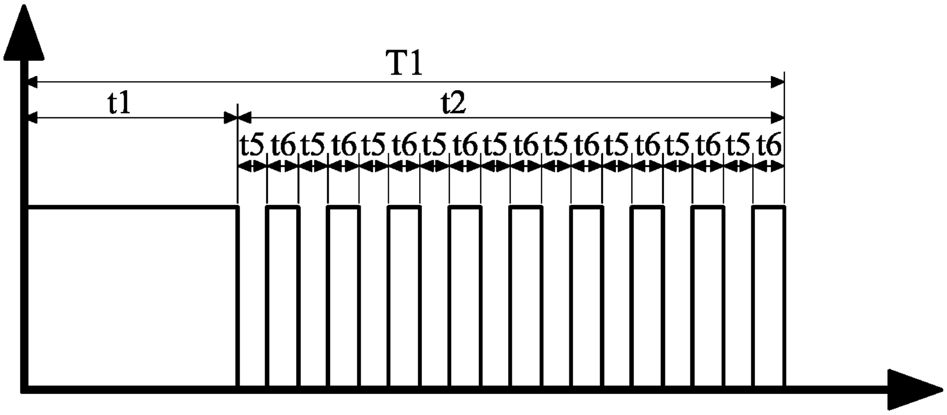
Figure 9:
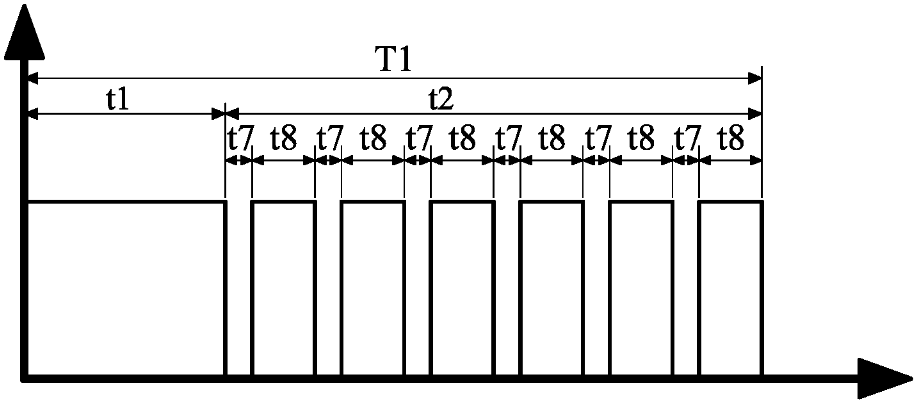
Figure 10:
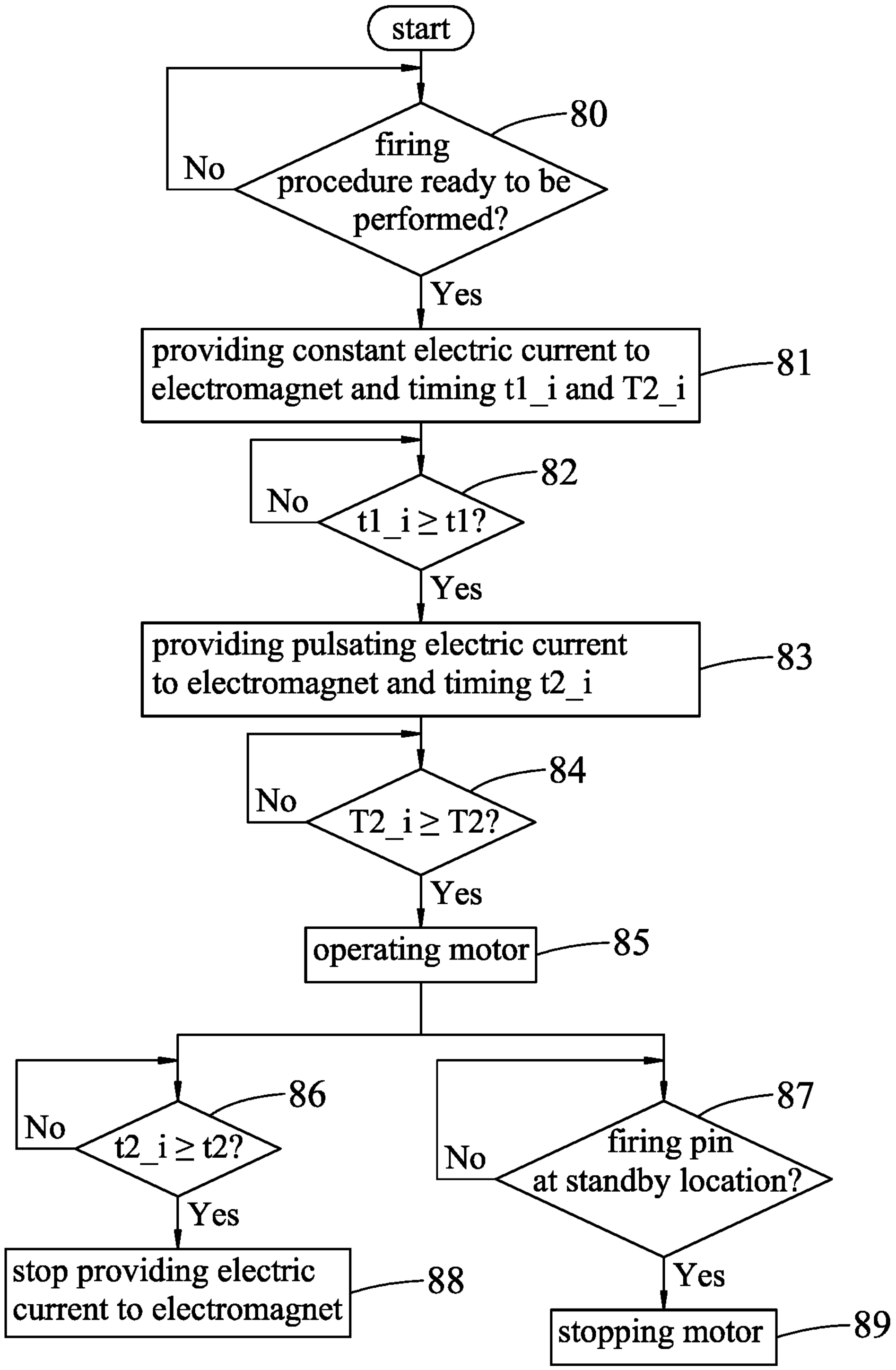
FIG. 10 is a flow chart illustrating a method of controlling the electric power tool according to an embodiment of the disclosure.

Referring to FIG. 2, the driving circuit 52 is electrically connected to the electromagnet 51 and the controller 7, and is configured to provide an electric current to excite the electromagnet 51. The driving circuit 52 includes a gate driver integrated circuit (IC) 521, a semiconductor switch 522 (e.g., MOSFET switch), and a flywheel diode 523 that is electrically connected to the electromagnet 51 in parallel. The electric power tool further includes an electrical connector 53 that electrically connects the driving circuit 52 and the electromagnet 51. The gate driver IC 521 is configured to receive a driving signal (as shown in FIGS. 7-9) from the controller 7, convert a voltage of the driving signal (e.g., having a voltage of 5V) into a desired voltage (e.g., 12V), and output the driving signal with the desired voltage to the gate of the semiconductor switch 522 to drive the semiconductor switch 522 to be on or off. In some embodiments, the driving signal is designed to ensure that a channel of the semiconductor switch 522 may be fully opened when turned on, so as to reduce a resistance of the semiconductor switch 522 and thus reduce heat generated by the semiconductor switch 522.

Figure 5:
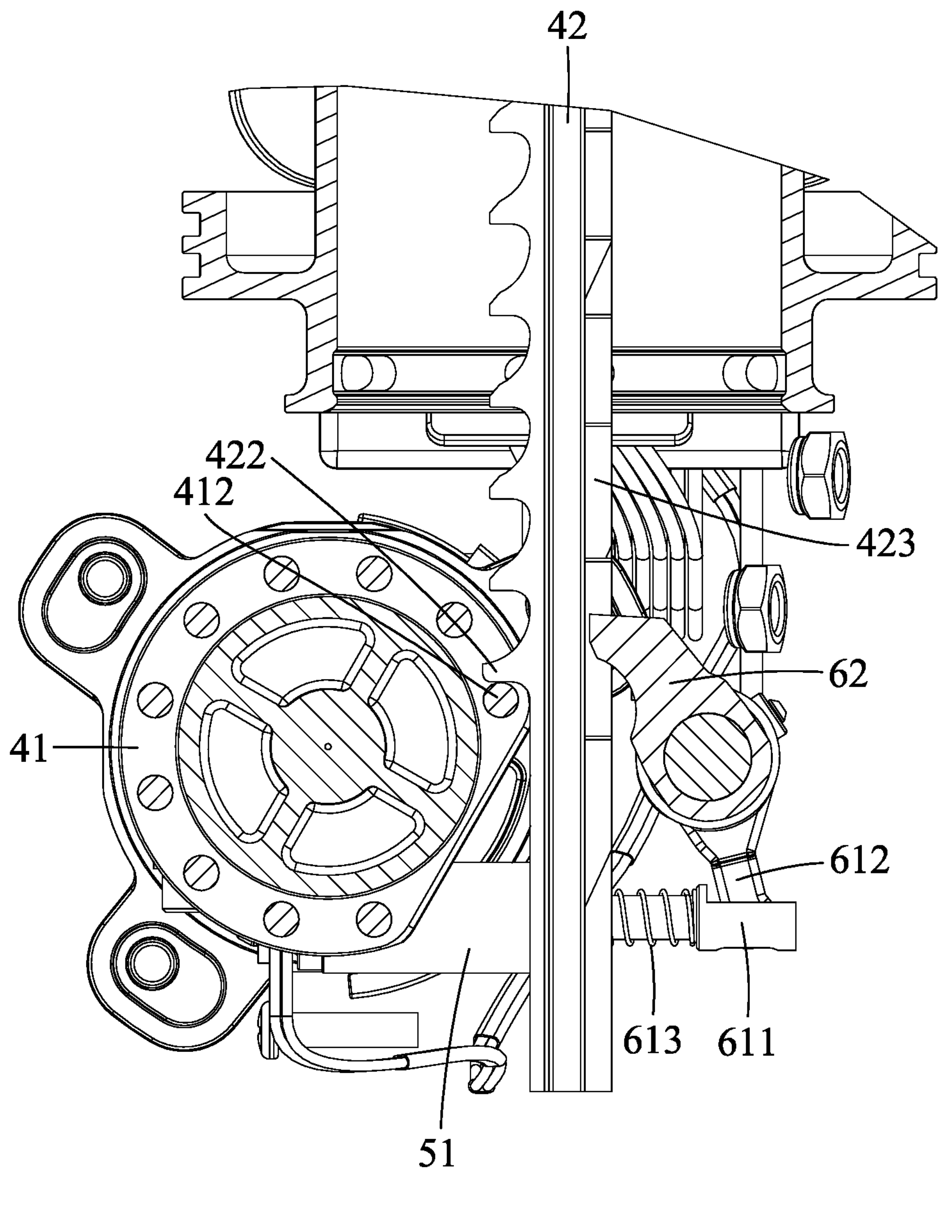
FIG. 5 is a side view illustrating a latch that is in a blocking position to block a firing pin according to an embodiment of the disclosure.
Figure 6:
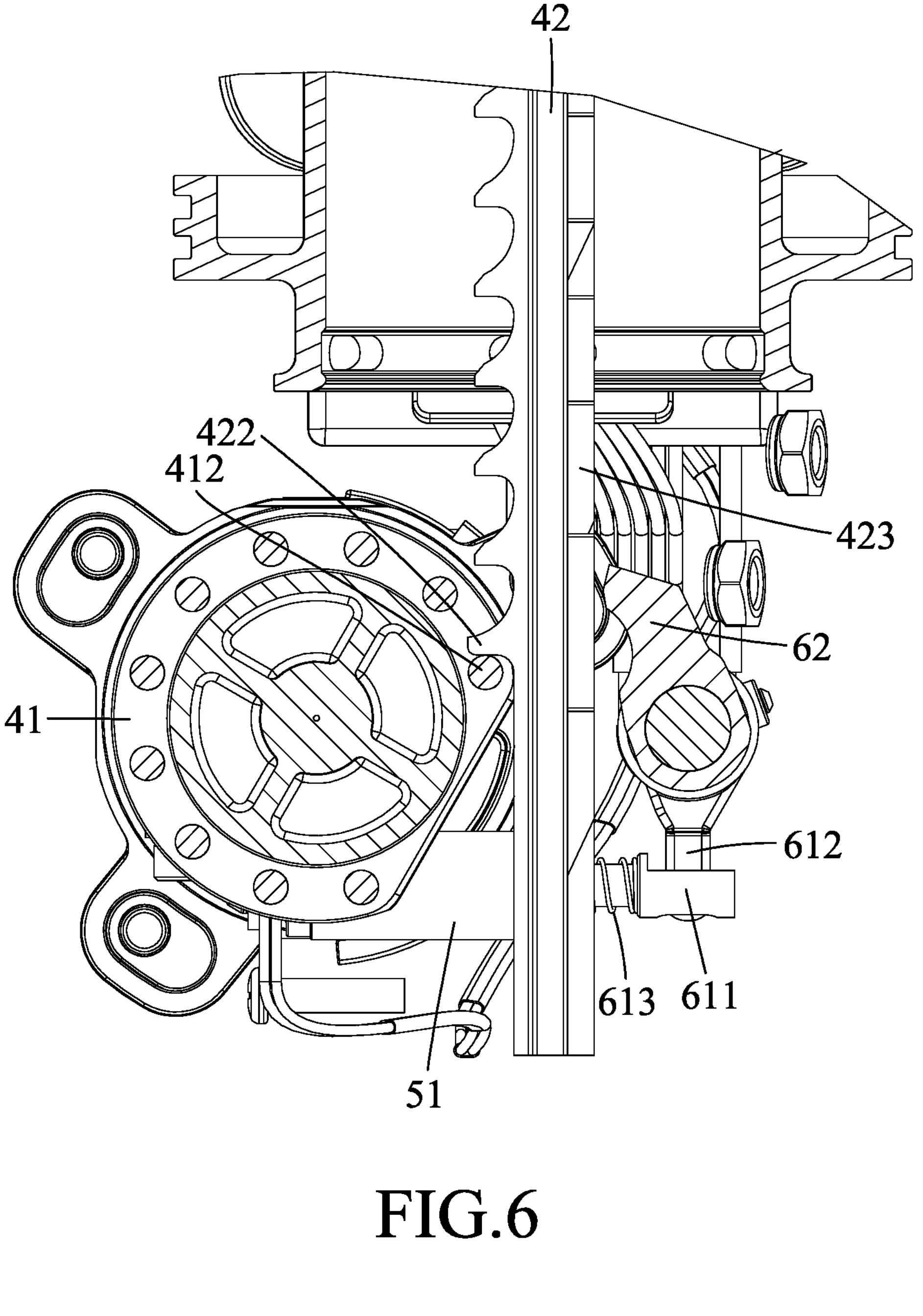
FIG. 6 is a side view illustrating the latch that is in a non-blocking position to not block the firing pin according to an embodiment of the disclosure.

Referring to FIG. 4, the joint 61 includes a pole 611 that partially extends into the electromagnet 51, a connecting component 612 that connects the actuator 611 and the latch 62, and a spring 613 that is connected between the electromagnet 51 and the pole 611. The pole 611 is made of magnetic material and may be attracted to the electromagnet 51 when the electromagnet 51 is excited. Further referring to FIG. 5, when the electromagnet 51 is in a non-excited state, the latch 62 is positioned at a blocking position in front of the block 423 to block the firing pin 42 from moving to the bottom dead center in the firing direction (i.e., disabling the firing pin 42 from performing the firing action), so as to avoid false firing. When the firing procedure is ready to be performed, the electromagnet 51 is excited by the driving circuit 52 to a fully excited state. The pole 611 is then attracted by the electromagnet 51 that is in the fully excited state to move in a first direction (i.e., the left direction in FIGS. 5 and 6) so as to drive the connecting component 612 to rotate clockwise, and as shown in FIG. 6, the latch 62 is driven by the connecting component 612 to rotate clockwise and move away from the block 423 to a non-blocking position where the latch 62 does not block the firing pin 42 from moving to the bottom dead center in the firing direction (i.e., enabling the firing pin 42 to perform the firing action). In addition, the spring 613 is compressed by the pole 611 when the pole 611 moves in the first direction. After performing the firing action, the electromagnet 52 may stop attracting the pole 611 by returning to the non-excited state, and the pole 611 is pushed by the spring 613 to move in a second direction (i.e., the right direction in FIGS. 5 and 6) opposite to the first direction, so as to drive the connecting component 612 to rotate counter-clockwise, thus moving the latch 62 to the blocking position as shown in FIG. 5.

Referring to FIGS. 2 and 7, the controller 7 is electrically connected to the driving circuit 52 and is configured to output the driving signal to control the driving circuit 52 to turn on the semiconductor switch 522 during an excitement period (T1) that includes a first time period (t1) and a second time period (t2) immediately after the first time period (t1). First, the controller 7 is configured to output the driving signal in a continuous manner to control the driving circuit 52 to continuously turn on the semiconductor switch 522, thus providing a constant electric current to excite the electromagnet 51 for the first time period (t1) to excite the electromagnet 51 to the fully excited state. Then, the controller 7 is further configured to, immediately after the first time period (t1), output the driving signal in a pulsating manner to control the driving circuit 52 to periodically turn on the semiconductor switch 522, thus providing a pulsating electric current to the electromagnet 51 for the second time period (t2) to keep the electromagnet 51 in the fully excited state.

In certain embodiments, the first time period (t1) is set to be not shorter than a fully excited time that is for the electromagnet 51 to reach the fully excited state from the non-excited state with the constant electric current. The fully excited time depends on the specifications of the electromagnet 51, and is usually between 20 to 100 milliseconds (ms). In this embodiment, the first time period (t1) is set to be equal to the fully excited time, but should not be limited to the abovementioned example. Since the fully excited time may have slight offsets due to production uncertainties, the first time period (t1) may set to be longer than the fully excited time to ensure that when the driving circuit 52 is providing the pulsating electric current to the electromagnet 51, the electromagnet 51 is already in the fully excited state.

The controller 7 may be implemented as a circuit (e.g., a microcontroller unit, MCU) with functions of analog-to-digital conversion (A/D conversion), input/output detection (I/O detection), and PWM output.

Referring to FIGS. 1, 3, and 7, the controller 7 is further configured to, after a predetermined time period (T2) since the controller 7 started controlling the driving circuit 52 to provide the constant electric current, control the driving circuit 52 to operate the motor 31 to drive the lifter 41, which then drives the firing pin 42 to perform the firing procedure. It should be noted that the predetermined time period (T2) should be at least longer than the first time period (t1) (i.e., longer than the fully excited time) to avoid the latch 62 blocking (or partially blocking) the firing pin 42 from performing the firing action. It should be further noted that the predetermined time period (T2) should not be too long, otherwise a time from the user pressing the trigger switch to completing the firing action would be too long. The controller 7 is further configured to control the driving circuit 52 to stop providing the electric current to the electromagnet 51 when the second time period (t2) has elapsed, and control the driving circuit 52 to stop the motor 31 from operating when the controller 7 has determined that the firing pin 42 has returned to the standby position based on a firing pin position switch (not shown) (i.e., the firing procedure has been completed). In this embodiment, the standby position is close to the top dead center so that the firing action may be performed quickly after the user presses the trigger switch. In this embodiment, the lifter 41 includes a magnet, the firing pin position switch may be implemented as a Hall sensor that is configured to detect a position of the magnet, and the controller 7 determines, based on the firing pin position switch, whether the magnet has moved to a predetermined position that corresponds to the firing pin 42 returning to the standby position. When the controller 7 determines that the magnet has moved to the predetermined position, the controller 7 controls the driving circuit 52 to stop the motor 31 from operating.

A relation of various time periods that are mentioned above are as following: $T2+Td<t1+t2<T2+Td+Tu$, where Td represents a time taken for the firing pin 42 to move from the standby position to the top dead center and then to the bottom dead center (i.e., the time for performing the firing action), and Tu represents a time taken for the firing pin 42 to be moved by the lifter 41 from the bottom dead center to the top dead center. The excitement period (T1) (i.e., a total time that the electromagnet 51 is being excited) is equal to the first time period (t1) plus the second time period (t2). It should be noted that after the firing pin 42 is moved from the standby position to the top dead center and then to the bottom dead center (T2+Td), and before the firing pin 42 is moved from the bottom dead center back to the top dead center (T2+Td+Tu), the controller 7 controls the driving circuit 52 to stop providing the pulsating electric current to the electromagnet 51. As such, the electromagnet 51 may be kept in the fully excited state when performing the firing action, thus keeping the latch 62 in the non-blocking position when the firing pin 42 is performing the firing action, and the electromagnet 51 may exit the fully excited state before the firing pin 42 is moved back to the top dead center, thus avoiding the firing pin 42 from accidently performing the firing action again when the lifting wheel 411 stops too slowly or fails to stop due to malfunction of the electric power tool.

Referring to FIGS. 1, 3, 7, and 10, a method of controlling the electric power tool includes: during the excitement period (T1), the controller 7 controlling the driving circuit 52 to provide the constant electric current to the electromagnet 51 for the first time period (t1) to excite the electromagnet 51 to the fully excited state; and immediately after the first time period (t1), the controller 7 controlling the driving circuit 52 to provide the pulsating electric current to the electromagnet 51 for the second time period (t2) to keep the electromagnet 51 in the fully excited state. To describe in further detail, the method of controlling the electric power tool includes steps 80 to 89.

When the electric power tool is powered up, the flow of the method enters step 80. In step 80, the controller 7 determines whether the firing procedure is ready to be performed, for example, by determining a condition of a safety switch (not shown), the trigger switch, and the firing pin position switch. The condition may be, for example, the safety switch and the trigger switch are both being pressed, and the firing pin position switch is indicating that the firing pin 42 is located at a correct position for performing the firing action (e.g., the standby position), etc. When the controller 7 determines that the firing procedure is ready to be performed, the flow proceeds to step 81.

In step 81, the controller 7 outputs the driving signal to the driving circuit 52, and the driving circuit 52 provides the constant electric current to the electromagnet 51 based on the driving signal to excite the electromagnet 51 to the fully excited state, thus driving the latch 62 to move from the blocking position to the non-blocking position. Accordingly, the firing pin 42 is able to perform the firing action. The controller 7 starts timing a third time period (t1_*i*) and a fourth time period (T2_*i*), both starting from a time point when the driving circuit 52 starts to provide the constant electric current to the electromagnet 51.

In step 82, the controller 7 determines whether the third time period (t1_*i*) has reached the first time period (t1) (e.g., 20 ms). If affirmative, the flow proceeds to step 83; otherwise, the flow of the method goes back to step 82.

In step 83, the controller 7 controls the driving circuit 52 to provide the pulsating electric current to the electromagnet 51, and the controller 7 starts timing a fifth time period (t2_*i*) starting from a time point when the driving circuit 52 starts to provide the pulsating electric current to the electromagnet 51.

In step 84, the controller 7 determines whether the fourth time period (T2_*i*) has reached the predetermined time period (T2) (e.g., 30 ms). If affirmative, the flow proceeds to step 85; otherwise, the flow goes back to step 84.

In step 85, the controller 7 outputs the control signal to operate the motor 31 to drive the lifter 41, which then drives the firing pin 42 to perform the firing action (i.e., driving the firing pin 42 to move from the standby position to the top dead center, where the firing pin 42 is then driven to the bottom dead center by the pressure in the pressure chamber 43), and immediately after the firing action, drives the firing pin 42 back toward the standby position. After step 85, the flow proceeds to step 86 and step 87.

In step 86, the controller 7 determines whether the fifth time period (t2_*i*) has reached the second time period (t2) (e.g., 100 ms). If affirmative, the flow proceeds to step 88; otherwise, the flow goes back to step 86.

In step 87, the controller 7 determines whether the firing pin 42 is located at the standby location based on the firing pin position switch. If affirmative, the flow proceeds to step 89; otherwise, the flow goes back to step 87.

When the controller 7 determines that the fifth time period (T2_*i*) has reached the second time period (t2), in step 88, the controller 7 controls the driving circuit 52 to stop providing the electric current to the electromagnet 51, thus making the latch 62 move back to the blocking position to block the firing pin 42 from performing the firing action.

When the controller 7 determines that the firing pin 42 is located at the standby location, in step 90, the controller 7 controls the driving circuit 52 to stop the motor 31 from operating, and the firing procedure ends. After steps 88 and 89 have being implemented, the method terminates and the electric power tool may be in a standby mode ready for the user to perform the firing procedure again (i.e., the method is implemented again) or enter a sleep mode when not being used for a standby time period.

Referring to FIGS. 1 and 7, it should be noted that frequency of the pulsating electric current should not be too low during the second time period (t2), otherwise, the electromagnet 51 may switch alternately between the fully excited state and a partially excited state, where the electromagnet 51 in the partially excited state may not produce a magnetic force strong enough to attract the pole 611 for keeping the latch 62 in the non-blocking position. A higher frequency of the pulsating electric current could reduce occurrence of the partially excited state, but would cause the electromagnet 51 to generate more heat. A higher duty cycle of the pulsating electric current would also cause the electromagnet 51 to generate more heat. Since the heat generated by the electromagnet 51 depends on a wire diameter of wire wound into a coil of the electromagnet 51 and the number of turns of the winding, both of which are related to size of the electromagnet 51, the frequency and the duty cycle of the pulsating electric current are set according to the size of the electromagnet 51 to avoid generating excess heat by the electromagnet 51 (i.e., reducing a time that the electromagnet 51 is provided with the electric current). The size of the electromagnet 51 depends on an available space in the electric power tool for placing the electromagnet 51.

During the second time period (t2), the frequency of the pulsating electric current shown in FIG. 7 may be greater than 1 kHz, and an off time period (t3) during which the pulsating electric current is in an off state is equal to an on time period (t4) during which the pulsating electric current is in an on state (i.e., the duty cycle of the pulsating electric current is 50%). The off time period (t3) should be short enough to make the electromagnet 51 remain in the fully excited state. The pulsating electric current may, for example, have a higher frequency as shown in FIG. 8, where the pulsating electric current has an off time period (t5) also equal to an on time period (t6) while the off time period (t5) and the on time period (t6) of the pulsating electric current of FIG. 8 are both shorter than the off time period (t3) and the on time period (t4) of the pulsating electric current of FIG. 7. The pulsating electric current may also have a different duty cycle as shown in FIG. 9, where the pulsating electric current has an off time period (t7) shorter than an on time period (t8) (i.e., the duty cycle of the pulsating electric current of FIG. 9 is greater than 50%). As such, if the voltage of the battery 21 is low, using a higher duty cycle may keep the electromagnet 51 in the fully excited state so as to produce a magnetic force strong enough to attract the pole 611 (as shown in FIG. 4).

In summary, the controller 7 controls the driving circuit 52 to first provide the constant electric current to fully excite the electromagnet 51, and then provide the pulsating electric current to keep the electromagnet 51 in the fully excited state during the firing action, thus reducing the heat generated by the electromagnet 51. Accordingly, there is no need to increase the wire diameter or the number of turns of the winding to reduce the heat generated by the electromagnet 51, and thus the electric power tool may be designed with a relatively smaller size and a lighter weight.

The relation of $T2+Td<t1+t2<T2+Td+Tu$ for the various time periods that are mentioned above are designed to ensure that the electromagnet 51 remains in the fully excited state to keep the latch 62 in the non-blocking position when the firing pin 42 is performing the firing action, and that the electromagnet 51 exits the fully excited state before the firing pin 42 is moved back to the top dead center so that the latch 62 may be moved to the blocking position to avoid false firing.

The predetermined time period (T2) is set to be longer than the fully excited time to ensure that the motor 31 only starts to operate after the electromagnet 51 has reached the fully excited state. In other words, when the motor 31 starts to operate for driving the firing pin 42 to perform the firing procedure, the latch 62 has already be driven by the electromagnet 51 to move to the non-blocking position, thus enabling the firing pin 42 to perform the firing action.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electric power tool comprising:

a motor;

a lifter configured to be driven by said motor;

a firing pin configured to be driven by said lifter to move from a bottom dead center to a standby position where said firing pin is ready to perform a firing action, the bottom dead center being farthest from the standby position in a firing direction from the standby position to the bottom dead center, said firing pin being at the bottom dead center after finishing the firing action;

an electromagnet;

a driving circuit electrically connected to said electromagnet and configured to provide an electric current to excite said electromagnet;

a latch configured to be moved by said electromagnet from a blocking position where said latch blocks the firing pin from moving to the bottom dead center to a non-blocking position where said latch does not block the firing pin from moving to the bottom dead center when said electromagnet is in a fully excited state, and be in the blocking position when said electromagnet is in a non-excited state; and a controller electrically connected to said driving circuit and configured to, during an excitement period, control said driving circuit to provide a constant electric current to said electromagnet for a first time period to excite said electromagnet to the fully excited state, and immediately after the first time period, control said driving circuit to provide a pulsating electric current to said electromagnet for a second time period to keep said electromagnet in the fully excited state.

2. The electric tool as claimed in claim 1, wherein said controller is electrically connected to said motor and is further configured to, after a predetermined time period since said controller started controlling said driving circuit to provide the constant electric current, operate said motor to drive said lifter which then drives said firing pin to perform the firing action, wherein the predetermined time period is longer than a time for said electromagnet to reach the fully excited state from the non-excited state with the constant electric current.

3. The electric tool as claimed in claim 1, wherein said controller is further configured to, after said firing pin finishes the firing action, control said driving circuit to stop providing the pulsating electric current to said electromagnet.

4. The electric tool as claimed in claim 1, wherein said controller is further configured to, after said firing pin is driven by said lifter to move from the standby position to a top dead center in an opposite direction opposite to the firing direction and then moves to the bottom dead center, and before said firing pin is driven by said lifter to move from the bottom dead center to the top dead center, control said driving circuit to stop providing the pulsating electric current to said electromagnet, the top dead center being farthest from the standby position in the opposite direction.

5. The electric tool as claimed in claim 1, wherein said controller is electrically connected to said motor and is further configured to control said driving circuit to stop providing the electric current to said electromagnet when the second time period has elapsed, and stop said motor from operating when said motor is operating to drive said lifter and when determining that said firing pin has returned to the standby position.

6. A method of controlling an electric power tool, the electric power tool including a motor, a lifter configured to be driven by the motor, a firing pin configured to be driven by the lifter to move from a bottom dead center to a standby position where the firing pin is ready to perform a firing action, an electromagnet, a driving circuit electrically connected to the electromagnet and configured to provide an electric current to excite the electromagnet, a latch configured to be moved by the electromagnet, and a controller electrically connected to the driving circuit, the bottom dead center being farthest from the standby position in a firing direction from the standby position to the bottom dead center, the method comprising steps of:

during an excitement period, the controller controlling the driving circuit to provide a constant electric current to the electromagnet for a first time period to excite the electromagnet to a fully excited state, such that the latch is moved by the electromagnet from a blocking position where the latch blocks the firing pin from moving to the bottom dead center to a non-blocking position where the latch does not block the firing pin from moving to the bottom dead center when the electromagnet is in the fully excited state, wherein the latch is in the blocking position when the electromagnet is in a non-excited state; and immediately after the first time period, the controller controlling the driving circuit to provide a pulsating electric current to the electromagnet for a second time period to keep the electromagnet in the fully excited state.

7. The method as claimed in claim 6, the controller being electrically connected to the motor, the method further comprising a step of, after a predetermined time period since the controller started controlling the driving circuit to provide the constant electric current, the controller operating the motor to drive the lifter which then drives the firing pin to perform the firing action, wherein the predetermined time period is longer than a time for the electromagnet to reach the fully excited state from the non-excited state with the constant electric current.

8. The method as claimed in claim 6, further comprising a step of, after the firing pin finishes the firing action, the controller controlling the driving circuit to stop providing the pulsating electric current to the electromagnet.

9. The method as claimed in claim 6, the method further comprising a step of:

the controller controlling the driving circuit to stop providing the pulsating electric current to the electromagnet after the firing pin is driven by the lifter to move from the standby position to a top dead center in an opposite direction opposite to the firing direction and then moves to the bottom dead center, and before the firing pin is driven by the lifter to move from the bottom dead center to the top dead center, wherein the top dead center is farthest from the standby position in the opposite direction.

10. The method as claimed in claim 6, the controller being electrically connected to the motor, the method further comprising steps of:

the controller controlling the driving circuit to stop providing the electric current to the electromagnet when the second time period has elapsed; and stopping the motor from operating when the motor is operating to perform the firing action and when determining that the firing pin has returned to the standby position.

* * * * *